Sept. 9, 1947. G. G. GAERTNER Re. 22,912

CONCRETE MIXER

Original Filed June 14, 1944 3 Sheets-Sheet 1

Inventor

Glenton George Gaertner

By Clarence A. O'Brien and Harvey B. Jacobson

Attorneys

Sept. 9, 1947. G. G. GAERTNER Re. 22,912

CONCRETE MIXER

Original Filed June 14, 1944 3 Sheets-Sheet 2

Inventor

Clenton George Gaertner

By Clarence A. O'Brien and Harvey B. Jacobson

Attorneys

Sept. 9, 1947. G. G. GAERTNER Re. 22,912

CONCRETE MIXER

Original Filed June 14, 1944 3 Sheets-Sheet 3

Inventor

Glenton George Gaertner

By Clarence A. O'Brien and Harvey B. Jacobson

Attorneys

Reissued Sept. 9, 1947

Re. 22,912

UNITED STATES PATENT OFFICE 22,912

CONCRETE MIXER

Glenton George Gaertner, La Grange, Tex., assignor to Harry Ferguson, Inc., Detroit, Mich., a corporation of Delaware Original No. 2,397,851, dated April 2, 1946, Serial No. 540,301, June 14, 1944. Application for reissue March 26, 1947, Serial No. 737,221

8 Claims. (Cl. 259—177)

This invention relates to concrete mixers and it has particular reference to mixers which may form part of an aggregate structure. Its principal object consists in providing a concrete mixer which may be attached to a tractor without affecting in any way the construction or usefulness of the latter and which, when so attached, will form an integral part of the tractor, moving along with the same, and deriving its own motion which is necessary for the mixing operation from the tractor.

It will be understood that the attachment of a concrete mixer to a tractor in such a way that the two units after having been attached to each other, form a single combined unit presents many special problems, as the stability of the tractor arrangement, the transmission of motion, the accessibility of the concrete mixer, the vertical lifting and lowering motion of the mixer and the connection and disconnection of the concrete mixer with the tractor are involved, the latter operations having to be performed in such a way that no change or alteration of the tractor which would impair connections with implements other than the mixer, is rendered necessary.

The present invention, therefore, consists in a mixer drum which, when connected or coupled with a tractor, is supported by the tractor itself, no special support for the drum or its accessories being necessary, and which derives all the various motions it has to perform during operation, such as rotation, lifting and lowering movements, and the like from the driving or driven parts of the latter.

For this purpose, the mixer drum whose rotational movement is derived from a belt, chain or the like, acting on its circumference, is carried by a rotatable shaft journaled within frame members, which are adapted to be connected with the conventional tractor links.

With most tractors, one of the links of the tractor is capable of a movement which can directly or indirectly be utilized to produce a lifting and lowering movement, while another link is capable of a limited rocking, swinging or other rotational movement around a pivot.

According to the invention the frame members are fixedly or pivotally connected with the links of the tractor in such a way that they utilize the movements imparted to said links and permit the transmission of the movements to the mixing drum. The latter, therefore, is able to derive its support and all its movements necessary for its operations from the tractor links whereby a construction of great simplicity and stability results which makes out of the tractor and the mixer a single stable unit for the duration of their connection.

With the above objects in view the invention consists in a combination of parts and members such as described in the following specification, shown in the accompanying drawings and enumerated in the claims, and it is to be understood that the modification shown which merely illustrates an example is not intended to limit the scope of the invention but merely illustrates the way in which it is to be carried into effect.

The following detailed specification has reference to the accompanying drawings, in which.

Figure 1:
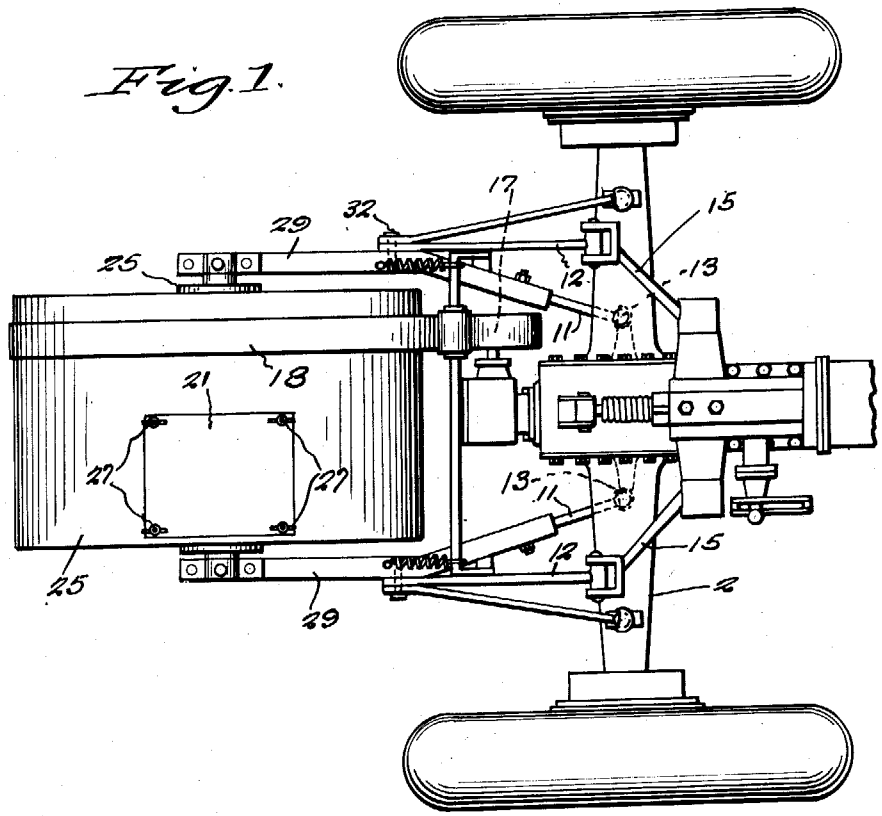
Figure 1 is a plan view of the invention with the concrete mixer attached to the tractor.
Figure 2:
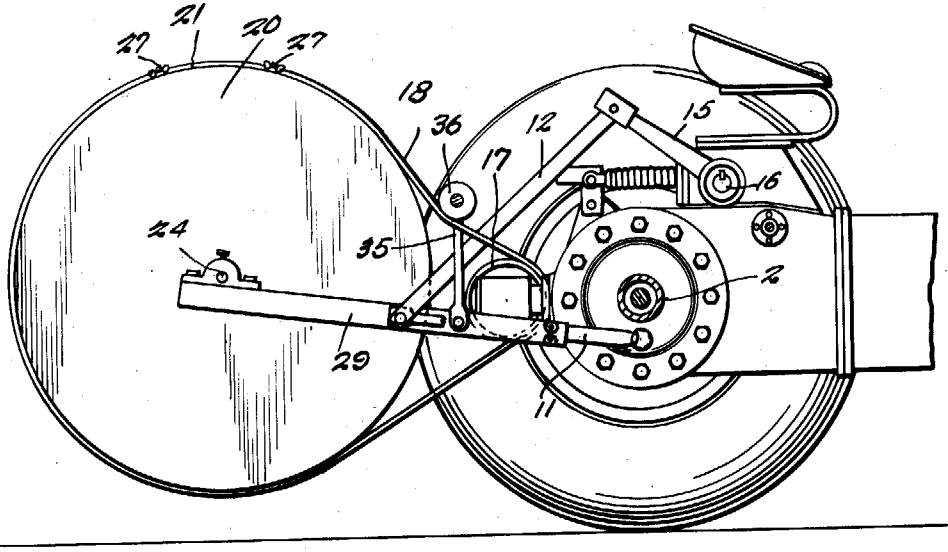
Figure 2 is an elevational side view of the concrete mixer when attached to the tractor, several parts of the tractor being shown as broken away in order to illustrate the connection between the tractor and the mixer.
Figure 3:
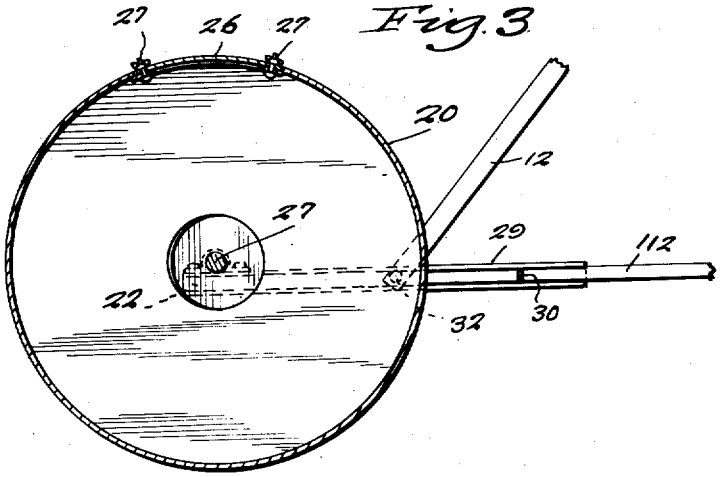
Figure 3 is an elevational longitudinal cross section through the mixer drum.
Figure 5:
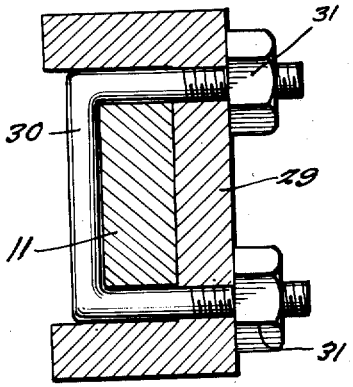
Figure 5 is on an enlarged scale a cross section through the coupling between the frame of the mixer drum and one of the links of the tractor, which serves to support the drum on the tractor.
Figure 4:
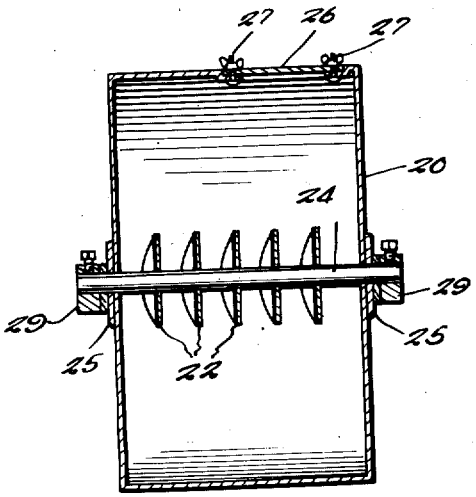
Figure 4 is a transverse section through the mixer drum.

In the drawings the concrete mixer is designated in general by 1; it is mounted on a tractor 2 of any conventional or approved design, a tractor known as the "Ford Ferguson" tractor being represented in the drawings. Those details of the tractor which have no reference to the present invention are not described as it is to be understood that the construction of the tractor itself is known to persons skilled in the art and is not a part of the present specification.

The tractor has connecting or draft links 11 on each side which are provided for the purpose of being connected with machines, implements or part of machines with which the tractor is to be associated.

The links 11 are connected with the tractor frame by means of pivots, of universal joints, or of ball and socket joints 13, according to the type of tractor used, the connection by means of a ball held within a socket being shown in the drawings.

The draft links 11 are supported by drop links 12 connected to respective cranks or arms 15. These cranks are connected with the shaft 16 which is rotated by the hydraulic or mechanical lifting mechanism of the tractor. By means of the cranks 15 and drop links 12 an upward pulling force is exerted on the draft links 11 when the shaft 16 is rocked which may be applied to any mechanism connected with the tractor. When the system is at rest it is firmly held and it may be considered as a rigid fixed system.

A third mechanism arranged on the tractor for the purpose of a connection with the implement or machine consists of the power take-off pulley 17 which is connected with the crank shaft of the engine of the tractor and is capable of transmitting power by a flexible driver shown as an endless belt 18.

The concrete mixer apparatus according to the invention consists of the mixer drum 20, which is preferably driven by the belt 18 laid around its circumference. Preferably the arrangement is such that the belt 18 runs on one side while the filling opening 21 of the drum is arranged laterally on the other side. Through this opening the drum is charged with the materials to be mixed and these materials are then conveyed axially through the drum 20 by means of the blades 22 which are of the well known shape and are mounted on a shaft 24. The shaft is connected with the drum 20 by means of flanges which are screwed or welded to the lateral walls of the drum.

The opening 21 of the drum may be closed by means of a lid 26 which is set in a recess of the drum and is secured to the latter by means of wing nuts 27.

As seen from the above description, the drum and the weight supported by it rests on the shaft 24. This shaft is supported by frame members 29 which are themselves supported by the connecting links of the tractor.

The frame members 29 preferably consist of channel irons so as to have the necessary rigidity and resistivity against deformation and they are of such dimensions that they may receive the projecting part of the connecting link 11 between the flanges of the channel irons. A clamp 30 effects a rigid connection between the parts 29 and 11 by means of the screws 31. The tractor may be provided with two side arms, to provide added lateral stability and to prevent the belt to run out of line. In this way part of the weight of the drum and its contents may be transmitted to the draft links 11.

The said frame members 29 are moreover connected with the drop links 12 of the tractor by pins 32 which pass through registering holes in the drop links 12, draft links 11 and frame members 29 as well as in the illustrated stabilizer links or side arms.

When the lever system 12, 15 is moved by the lifting system of the tractor, the frame 29 is raised or lowered according to the direction in which the shaft 16 is moved and as the connecting link 11 and the frame 29 are rigidly connected the latter rotates around the ball and socket connection 13. The drum is thus raised or lowered, the first operation being performed to facilitate filling of the drum while the last-named operation is needed during the emptying of the drum.

Finally an auxiliary frame 35 carrying a roller 36 may be mounted on the frame 29 to adjust the tension of the driving belt 18 and to facilitate the mounting or dismounting of the mixing drum. This frame is preferably under the tension of a spring 37 which presses the roller against the belt.

When the tractor with the attached mixer has been conveyed to the place where the concrete is needed, the mixer is first lifted by means of hydraulic or mechanical lifting apparatus of the tractor which actuates the shaft 16 and the lifting lever system 15, 12, 11. The lid 21 is unscrewed and the charge is introduced.

After the lid has been closed the drum 20 is lowered to the working position and the pulley 17 is connected with the power shaft (not shown) of the tractor. The drum now rotates and by means of the blades 22 mixes the aggregate materials of the charge and the water which is introduced in the well known manner, advancing the charge axially through the drum by means of the blades. When mixing has been completed, and the opening of the drum has been turned downwardly, the drum is lowered and discharging into wheel barrows or on the spot to be covered by concrete may take place.

As seen from the foregoing description the drum is supported by the tractor and is driven by power furnished by the tractor; it is neither in need of a special supporting means such as a trailer or the like nor does it require a separate engine. The complete mixing apparatus, when coupled with the tractor is, therefore, a completely mobile unit. It can be moved to all places to which the tractor itself can be moved.

It is to be understood that the invention mainly resides in the means, and combination of means and apparatus by means of which the concrete mixer may be joined to a tractor in such a way that a stable unit results which may be moved and operated by the tractor and that many changes may be introduced without departing from the essence of the invention.

What I claim is:

1. In an arrangement of the type specified for mixing concrete and for mounting on a conventional tractor provided with a draft linkage pivoted to the tractor and provided with a power lift mechanism so that said linkage may be lifted and lowered and further provided with a power take-off shaft for transmitting a rotational movement, a concrete mixer comprising: a mixer drum, driven means for imparting a rotational movement to said drum, means for supporting said drum including a frame, means for connecting said frame detachably with said draft linkage for raising and lowering in unison therewith, and means on the power takeoff shaft of the tractor for operatively connecting the latter with said driven means for rotating the drum.

2. In a concrete mixing arrangement of the type described adapted to be detachably associated with a conventional tractor and when attached forming a unit with the latter, the said conventional tractor being provided with a draft linkage pivotally connected with the tractor and arranged for being lifted and lowered by a power drive, said tractor being provided in addition with a power takeoff shaft: the combination of a mixing drum, means adapted to be driven by said power takeoff shaft for rotating said mixing drum, means for supporting said drum comprising a rotatable shaft, a frame carrying said shaft, a detachable connecting means for coupling said frame with the pivoted draft linkage of the tractor for lifting and lowering the frame together with the drum.

3. In a concrete mixer attachment for a tractor having a power elevated draft linkage trailingly pivoted on its rear end portion and also being equipped with a power take-off: the combination of a mixing container having an internally located stirring device relatively rotatable with respect to the contents of said container, means for detachably securing said container to the draft linkage for bodily lifting and lowering thereby, and means connectable with said power take-off for effecting relative rotation of said stirring device while leaving said container free for bodily raising and lowering by the draft linkage.

4. In a concrete mixer attachment for a tractor having a power elevated draft linkage trailingly pivoted on its rear end portion and also equipped with a power take-off: the combination of a revoluble mixing container, means for detachably supporting said container on said linkage for bodily lifting and lowering thereby and journalling said container while so supported for rotation, and means connectable with said power take-off for effecting rotation of said container while leaving the same free for bodily raising and lowering by the draft linkage.

5. In a concrete mixer attachment for a tractor having a power elevated draft linkage trailingly pivoted on its rear end portion, the combination of a mixing container having a discharge opening, a supporting structure, means mounting said container on said supporting structure for movement into and out of a position in which said opening is located for gravity discharge of the container contents, and means for detachably securing said supporting structure to the draft linkage for bodily lifting and lowering of the container by the linkage while maintaining such container in an overhanging position at the rear of the tractor.

6. In a concrete mixer attachment for a tractor having a power elevated draft linkage trailingly pivoted on its rear end portion as well as a power take-off pulley revoluble about an axis transverse to the tractor path of travel: the combination of a revoluble mixing drum, means for detachably supporting said drum on said linkage for bodily lifting and lowering thereby and journalling said drum while so supported for rotation about an axis transverse to the tractor's path of travel, and means including an endless flexible driver trained circumferentially about said drum and adapted to be trained over said pulley for drivingly revolving said drum by power derived from said pulley.

7. In a concrete mixer attachment for a tractor having a power elevated draft linkage trailingly pivoted on its rear end portion as well as a power take-off pulley revoluble about an axis transverse to the tractor path of travel said axis being spaced appreciably both horizontally and vertically from the axis of pivoting of the draft linkage: the combination of a revoluble mixing drum, means for detachably supporting said drum on said linkage for bodily lifting and lowering thereby and journalling said drum while so supported for rotation about an axis transverse to the tractor's path of travel, means including an endless flexible driver trained circumferentially about said drum and adapted to be trained over said pulley for drivingly revolving said drum by power derived from said pulley, a revoluble idler, and spring mechanism for retaining said idler urged against said driver to prevent slacking of the latter caused by the separation of the axes of said pulley and said linkage and as an incident to bodily raising and lowering of said drum by the draft links.

8. In a concrete mixer attachment for a tractor having a power elevated pair of laterally spaced draft links trailingly pivoted on its rear end portion for vertical swinging movement and also having a power take-off pulley revoluble about an axis transverse to the tractor's path of travel: the combination of a mixing drum having a cylindrical exterior portion, means detachably connectable with the draft links for supporting said drum between such links for rotation about a horizontal axis passing adjacent the respective longitudinal center lines of the links and for bodily lifting and lowering by the links, a driver belt trained circumferentially over said cylindrical portion of said drum and adapted to be trained over the pulley for effecting powered rotation of the drum, said drum having a filling and discharge opening in its periphery adjacent said driving belt, and a closure for such opening.

GLENTON GEORGE GAERTNER.

REFERENCES CITED

The following references are of record in the file of this patent:

UNITED STATES PATENTS

| Number | Name | Date |
|---|---|---|
| 1,540,381 | Wynn | June 2, 1925 |
| 1,942,277 | Davis et al. | Jan. 2, 1934 |
| 2,252,837 | Dicke | Aug. 19, 1937 |
| 2,337,209 | Seeler | Dec. 21, 1943 |

FOREIGN PATENTS

| Number | Country | Date |
|---|---|---|
| 90,094 | Sweden | Aug. 24, 1947 |
| 287,016 | Great Britain | Mar. 15, 1928 |